US012646783B2

(12) United States Patent
Kawakami

(10) Patent No.: US 12,646,783 B2
(45) Date of Patent: Jun. 2, 2026

(54) BATTERY PACK

(71) Applicant: SANYO Electric Co., Ltd., Osaka (JP)

(72) Inventor: Satoshi Kawakami, Hyogo (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 579 days.

(21) Appl. No.: 18/246,668

(22) PCT Filed: Oct. 5, 2021

(86) PCT No.: PCT/JP2021/036736
§ 371 (c)(1),
(2) Date: Mar. 24, 2023

(87) PCT Pub. No.: WO2022/085422
PCT Pub. Date: Apr. 28, 2022

(65) Prior Publication Data
US 2023/0369700 A1 Nov. 16, 2023

(30) Foreign Application Priority Data

Oct. 23, 2020 (JP) ................................. 2020-178420

(51) Int. Cl.
*H01M 50/242* (2021.01)
*H01M 50/204* (2021.01)
(Continued)

(52) U.S. Cl.
CPC ....... *H01M 50/242* (2021.01); *H01M 50/204* (2021.01); *H01M 50/256* (2021.01); *H01M 50/227* (2021.01)

(58) Field of Classification Search
None
See application file for complete search history.

(56) References Cited

U.S. PATENT DOCUMENTS

2013/0164580 A1* 6/2013 Au ...................... H01M 50/271
429/96
2017/0018747 A1* 1/2017 Yamada .............. H01M 10/625
(Continued)

FOREIGN PATENT DOCUMENTS

JP 2007-273180 10/2007
JP 2009-051515 A 3/2009
(Continued)

OTHER PUBLICATIONS

Extended Supplementary European Search Report dated Sep. 6, 2024, issued in counterpart Application No. 21882563.6. (8 pages).
(Continued)

*Primary Examiner* — Gregg Cantelmo
(74) *Attorney, Agent, or Firm* — WHDA, LLP

(57) ABSTRACT

A battery pack includes core pack housing a plurality of cells, and outer case housing core pack. Outer covering case is formed in a box shape by connecting outer peripheral wall to an outer peripheral edge of a pair of surface plates, and outer peripheral wall provided at each convex corner of each of surface plates include impact-absorbing wall that is an outside surface, main body wall disposed at an inner side of impact-absorbing wall, and impact-absorbing gap separating impact-absorbing wall and main body wall from each other at a predetermined interval. Impact-absorbing gap opens toward surface plates.

9 Claims, 10 Drawing Sheets

(51) Int. Cl.
 *H01M 50/227* (2021.01)
 *H01M 50/256* (2021.01)

(56) References Cited

U.S. PATENT DOCUMENTS

| | | | |
|---|---|---|---|
| 2020/0127256 A1 | 4/2020 | Bae et al. | |
| 2020/0259139 A1* | 8/2020 | Nomizo | H01M 50/209 |
| 2020/0350532 A1* | 11/2020 | Kaiser | H01M 50/242 |
| 2021/0057688 A1* | 2/2021 | Niziol | H01M 50/256 |

FOREIGN PATENT DOCUMENTS

| | | |
|---|---|---|
| JP | 2011-192592 | 9/2011 |
| JP | 2014-139866 A | 7/2014 |
| KR | 10-2020-0044582 A | 4/2020 |

OTHER PUBLICATIONS

International Search Report of PCT application No. PCT/JP2021/
036736 dated Dec. 21, 2021.

\* cited by examiner

FIG. 5

BATTERY PACK

TECHNICAL FIELD

The present invention relates to a battery pack including a plurality of cells housed in an outer covering case, and particularly relates to a battery pack excellent in impact strength.

BACKGROUND ART

A battery pack requires impact strength. In particular, a battery pack housing a large number of cells and being heavy requires enough impact strength not to be broken due to a large impact such as dropping. A battery pack housing a large number of cells has a large charge/discharge capacity, is heavy, and is expensive. Therefore, if such a battery pack is damaged due to dropping or the like and becomes unusable, the economic loss is extremely large. Furthermore, a battery pack having large charge/discharge capacity and being expensive is heavy and susceptible to a large impact such as dropping and easily damaged. Therefore, it is extremely important to increase impact strength. In order to achieve such requirement, battery packs including an impact-absorbing gap inside a case have been developed (see PTL 1 and PTL 2).

CITATION LIST

Patent Literature

PTL 1: Japanese Patent Application Unexamined Publication No. 2007-273180
PTL 2: Japanese Patent Application Unexamined Publication No. 2011-192592

SUMMARY OF THE INVENTION

A battery pack of PTL 1 is provided with an impact-absorbing gap between an inner case and an outer case, and an elastic spring made of a metal plate is placed in the impact-absorbing gap. Since this battery pack includes the inner case and the outer case in a unique structure and includes the elastic spring that is machined to a specific shape in the impact-absorbing gap, a component cost is increased. In addition, since this battery pack is assembled with the elastic spring placed in a fixed position in the cases, assembly requires a lot of time and effort, and assembly cost is increased.

A battery pack of PTL 2 includes an impact-absorbing wall provided to a case, an inner wall provided at an inner side of the impact-absorbing wall, and a core pack of cells at an inner side of the inner wall. The inner wall is formed in a unique shape and the impact-absorbing gap is provided between the inner wall and the core pack of cells. In the battery pack of this structure, the core pack of cells undergoes a local impact, thus making it difficult to protect an entire body of the heavy core pack from a strong impact.

The present invention is developed to solve the above-mentioned problems, and an important object of the present invention is to provide a battery pack which can allow an outer covering case to absorb an impact acting on an incorporated core pack of cells, thus increasing impact strength.

A battery pack according to one aspect of the present invention includes a core pack housing a plurality of cells, and an outer covering case housing the core pack. The outer covering case is formed in a box shape by connecting an outer peripheral wall to an outer peripheral edge of each of a pair of surface plates, the outer peripheral wall provided at each convex corner of each of the pair of surface plates includes an impact-absorbing wall that is an outside surface, a main body wall disposed at an inner side of the impact-absorbing wall, and an impact-absorbing gap separating the impact-absorbing wall and the main body wall from each other at a predetermined interval, and the impact-absorbing gap opens toward the surface plates.

The battery pack mentioned above allows the outer covering case itself to absorb an impact acting on the core pack housing the plurality of cells, and achieves high impact strength. In particular, the battery pack achieves high impact property strength by allowing the convex corner to effectively absorb an impact due to dropping or the like.

BRIEF DESCRIPTION OF DRAWINGS

FIG. 5 is a sectional perspective view showing another example of the outer covering case of the battery pack shown in FIG. 1.

DESCRIPTION OF EMBODIMENTS

A battery pack according to one exemplary embodiment of the present invention includes a core pack housing a plurality of cells, and an outer covering case housing the core pack. The outer covering case is formed in a box shape by connecting an outer peripheral wall to an outer peripheral edge of each of a pair of surface plates, the outer peripheral wall provided at each convex corner of each of the pair of surface plates includes an impact-absorbing wall that is an outside surface, a main body wall disposed at an inner side of the impact-absorbing wall, and an impact-absorbing gap separating the impact-absorbing wall and the main body wall from each other at a predetermined interval, and the impact-absorbing gap opens toward the surface plates.

Figure 4:
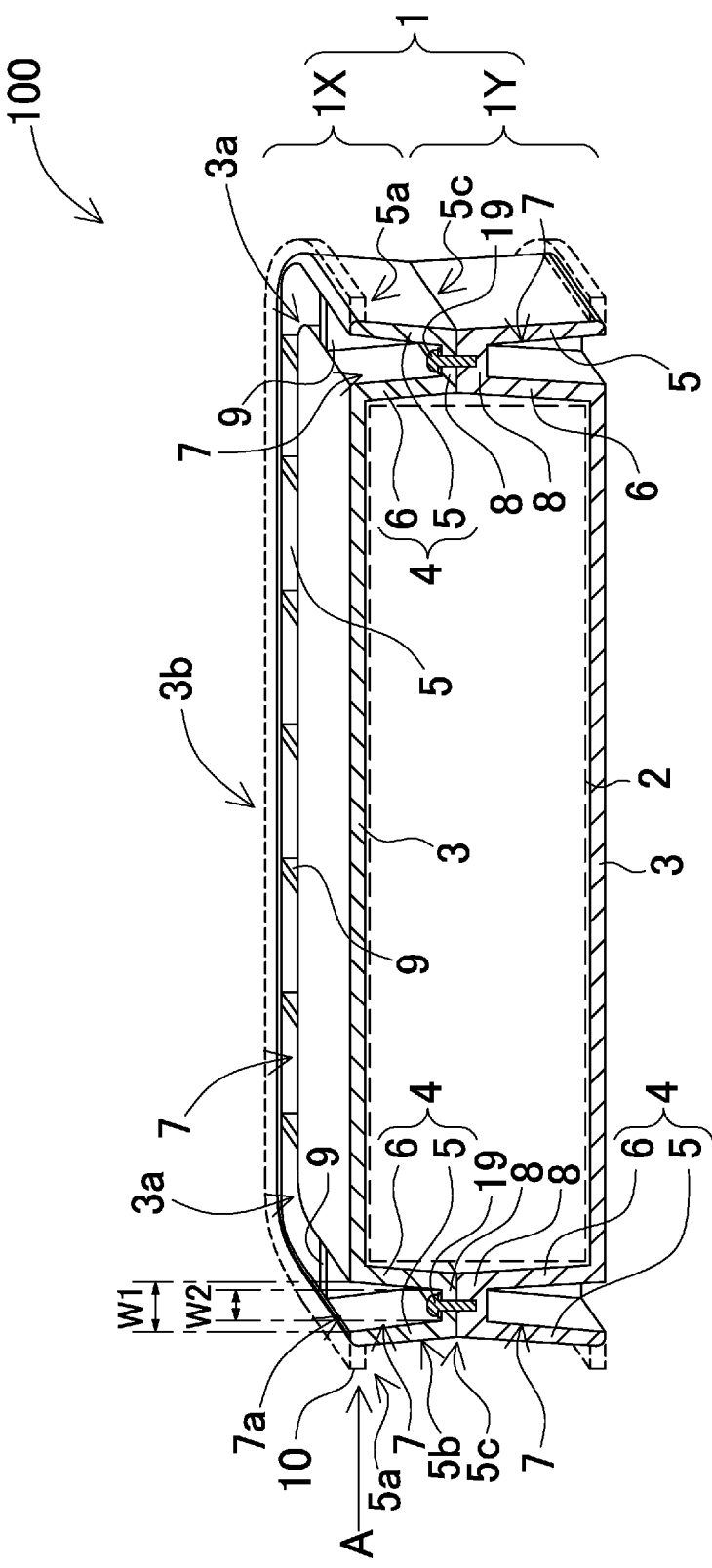
FIG. 4 is a sectional perspective view showing an outer covering case of the battery pack shown in FIG. 1.

The battery pack mentioned above allows the outer covering case itself to absorb an impact acting on the incorporated core pack, and achieves high impact strength. This is because the battery pack mentioned above is provided with the impact-absorbing gap that separates the main body wall from the impact-absorbing wall on the outer peripheral wall at the convex corner that receives an impact due to dropping or the like, and the impact-absorbing gap opens toward the surface plates. A sectional perspective view of FIG. 4 shows a state in which the outer peripheral wall of the convex corner is deformed by an impact. As shown in this drawing, outer peripheral wall 4 at convex corner 3a includes impact-absorbing wall 5 at the outer side of main body wall 6 via impact-absorbing gap 7, and impact-absorbing gap 7 opens toward surface plates 3. As a result, as shown in the arrow A, impact-absorbing wall 5 is deformed and absorbs the impact received by outer peripheral wall 4 at convex corner 3a, thus improving the impact strength of convex corner 3a. Furthermore, in the battery pack mentioned above, since the impact-absorbing wall is deformed and absorbs an impact, an effect of protecting the incorporated core pack from an impact by the buffer action of the impact-absorbing wall.

When a battery pack is dropped, it is extremely unlikely that the battery pack is brought into surface contact with a surface such as a horizontal ground in a horizontal position or a vertical position and receives an impact. Since dropping battery packs are dropped in an inclined position, with few exceptions, when the battery pack collides with the ground or the like, the convex corner of the outer peripheral wall, which is any one of the side edges, collides with the ground and receives an impact. Since the battery pack mentioned above includes an impact-absorbing gap that opens toward the surface plates, a tip of the impact-absorbing wall is disposed at the side edge of the outer peripheral wall. The impact-absorbing wall is easily deformed in a tip edge thereof. Therefore, an impact, which the tip edge of the impact-absorbing wall positioned in the side edge of the outer peripheral wall receives, is efficiently absorbed by the impact-absorbing wall, thus improving the impact strength of the outer covering case, and further suppressing the impact of the incorporated battery pack by the buffer action of the impact-absorbing wall.

In a battery pack according to another embodiment of the present invention, an opening width (W1) of the impact-absorbing gap is 2 mm or more.

In a battery pack according to another embodiment of the present invention, the outer covering case includes a first case formed in a box shape by integrally forming one of the pair of the surface plates with the outer peripheral wall on an outer periphery of the one of the pair of the surface plates, and a second case closing an opening part of the first case, the first case and the second case each include a connection flange connecting the main body wall and the impact-absorbing wall to each other, and the first case and the second case are connected to each other through the connection flanges.

In a battery pack according to another embodiment of the present invention, the outer peripheral wall includes a connection rib locally connecting the impact-absorbing wall and the main body wall to each other.

In a battery pack according to another embodiment of the present invention, the impact-absorbing wall includes a longitudinal rib protruding on an outer side surface and integrally provided along a tip edge.

In the battery pack mentioned above, since an impact locally acting on the tip edge of the impact-absorbing wall can be dispersed by the longitudinal rib, the impact strength of the impact-absorbing wall can be strengthened.

In a battery pack according to another embodiment of the present invention, each of the convex corners of each of the surface plates includes a curved part curved at a predetermined radius of curvature, and an opening part of the impact-absorbing gap is a slit curved along the curved part of each of the convex corners of each of the surface plates.

In a battery pack according to another embodiment of the present invention, the outer covering case includes a grip, and the outer covering case includes the impact-absorbing wall on convex corners on both sides of the outer peripheral wall located at an opposite side of the grip.

Even if the battery pack mentioned above is inadvertently dropped when the battery pack is carried by holding the grip, the impact-absorbing wall located in the lower part at the side opposite to the grip can absorb an impact and prevent damage.

In a battery pack according to another embodiment of the present invention, a surface of the tip edge of the impact-absorbing wall is a protrusion protruding more than a center part of the outer peripheral wall.

No matter what position the battery pack is dropped, the impact-absorbing wall effectively absorbs an impact, and high impact strength is achieved. This is because no matter what position the battery pack is dropped, the protrusion at the tip edge of the impact-absorbing wall collides with the ground and absorbs an impact.

In a battery pack according to another embodiment of the present invention, an outside surface of the impact-absorbing wall is an inclined surface protruding toward the tip edge from the center part.

In a battery pack according to another embodiment of the present invention, an entire shape of each of the surface plates is polygonal, and the outer peripheral wall connected to each of linear regions of each of the surface plates being polygonal includes the protrusion on both ends of each of the linear regions.

No matter what position the battery pack is dropped, the impact-absorbing wall effectively absorbs an impact, and high impact strength is achieved. This is because no matter what position the battery pack is dropped, the protrusions provided on both ends of each of the linear regions locally collide with the ground or the like, and the outer peripheral wall at the convex corners provided on both end portions of each of the linear regions absorbs an impact.

Hereinafter, the present invention is described in detail with reference to the drawings. In the following description, terms to indicate specific directions or positions (for example, "upper", "lower", and other terms including these terms) are used as necessary for easy understanding of the invention with reference to the drawings, and the technical scope of the present invention is not limited by the meanings of the terms. Furthermore, the parts having the same reference numerals appearing in a plurality of drawings indicate the same or equivalent parts or members.

In addition, the exemplary embodiment described below is specific examples of the technical idea of the present invention, and the present invention is not limited to the following exemplary embodiment. The dimensions, materials, shapes, relative arrangements, and the like, of the components described below are not intended to limit the scope of the present invention but are intended for exemplification, unless specifically stated. Furthermore, the contents described in one exemplary embodiment and Example can be applied to other exemplary embodiments and Examples. The sizes and positional relationships of members shown in the drawings may be exaggerated in order to clarify the explanation.

(Battery Pack 100, 200, 300)

Figure 1:
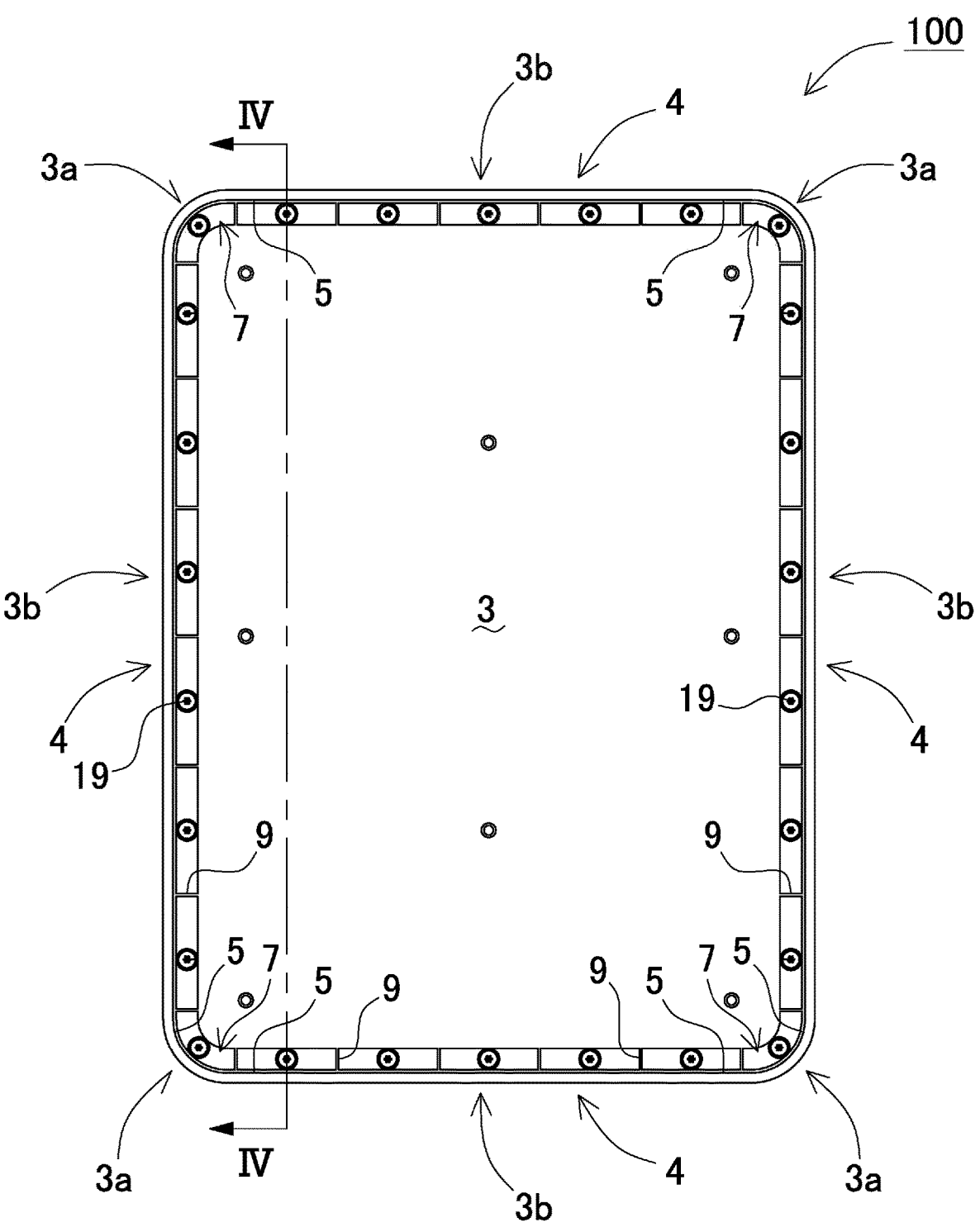
FIG. 1 is a plan view of a battery pack according to a first exemplary embodiment of the present invention.
Figure 2:
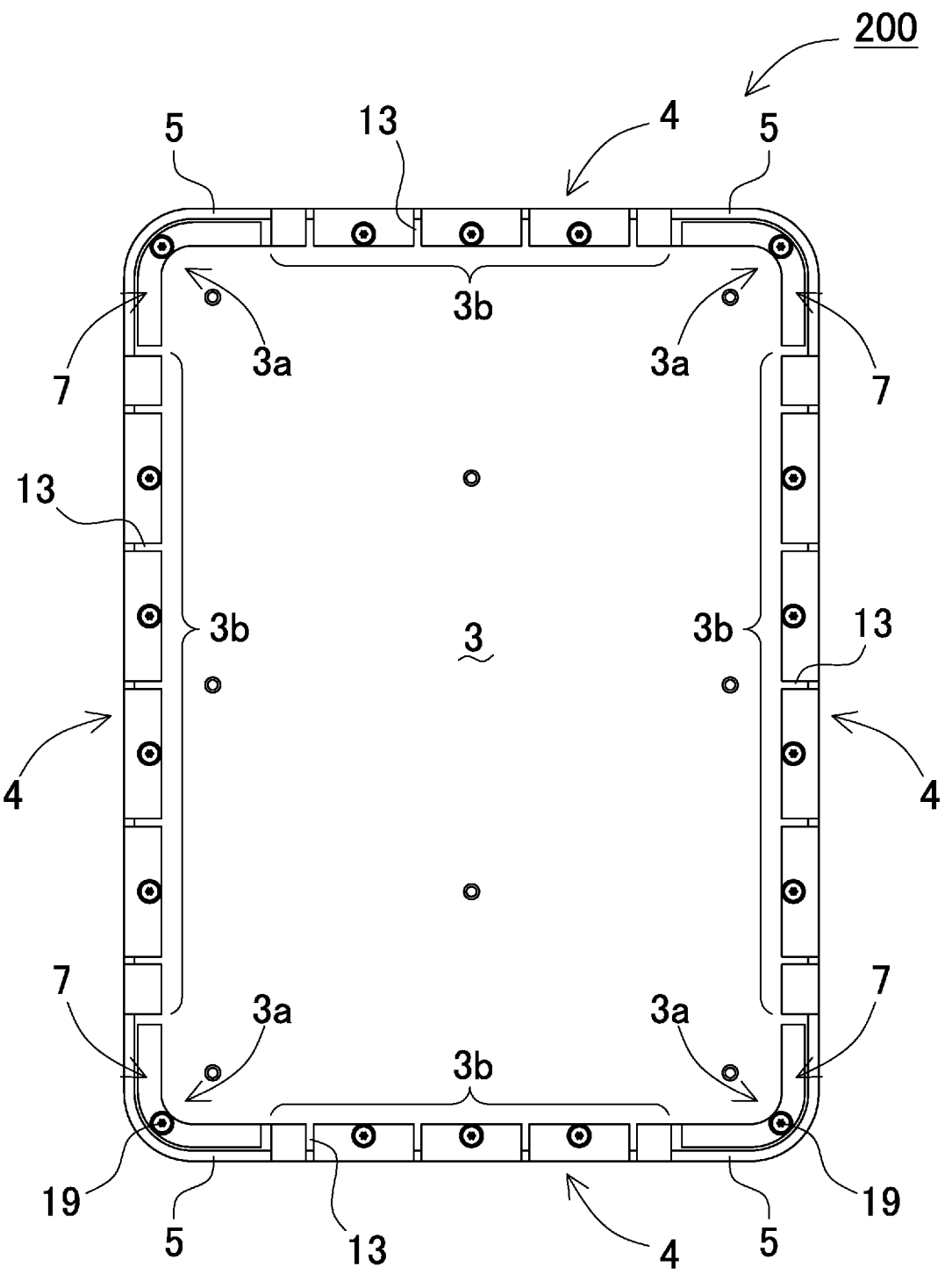
FIG. 2 is a plan view of a battery pack according to a second exemplary embodiment of the present invention.
Figure 3:
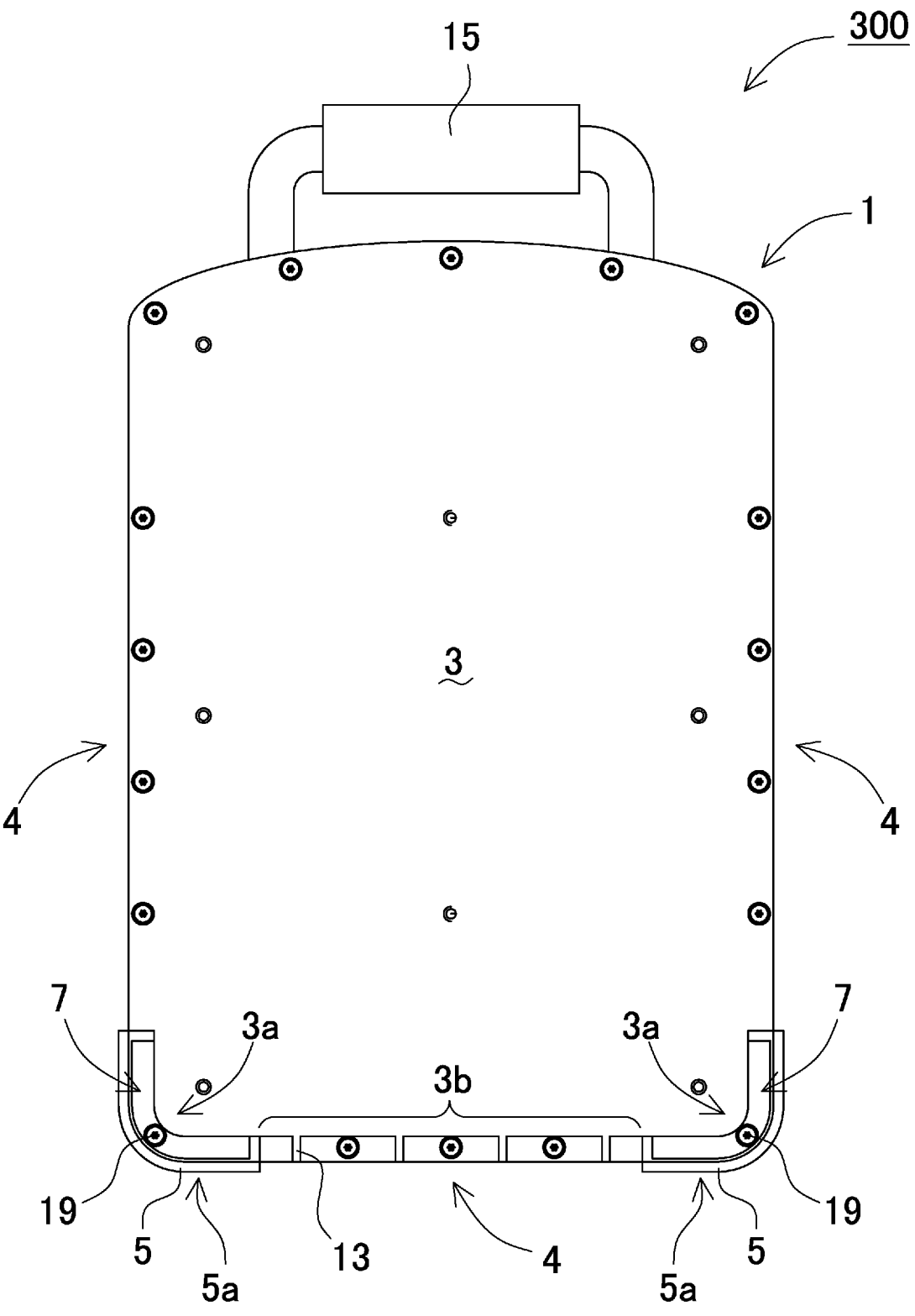
FIG. 3 is a front view of a battery pack according to a third exemplary embodiment of the present invention.
Figure 5:
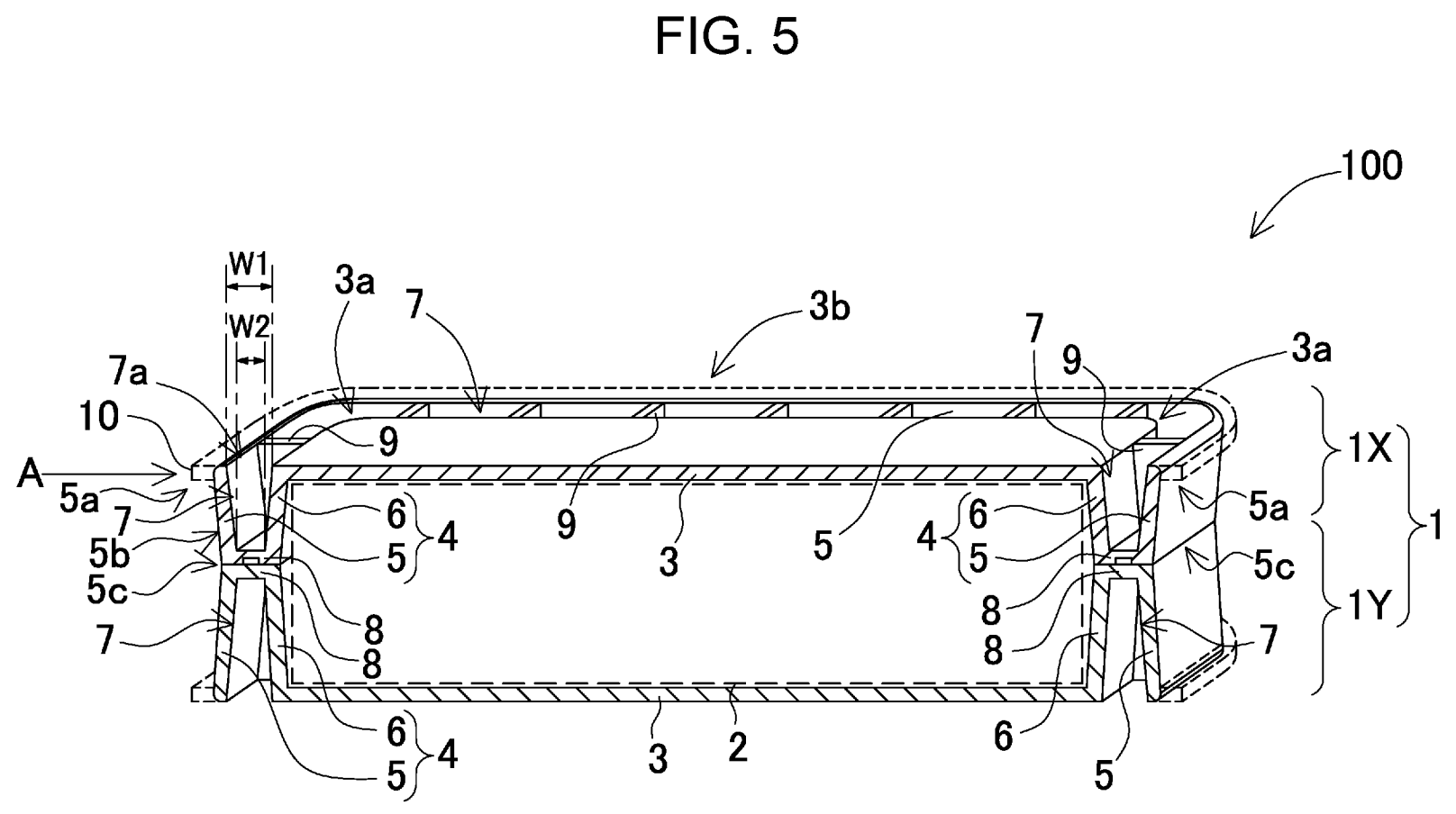

Battery packs 100, 200, and 300 shown in plan views of FIGS. 1 to 3 and sectional views of FIGS. 4 and 5 respectively include core pack 2 housing a plurality of cells inside outer covering case 1. FIG. 4 is a sectional perspective view showing battery pack 100 taken along line IV-IV of FIG. 1. FIG. 5 is a sectional perspective view showing another example of battery pack 100 taken along line IV-IV of FIG. 1. Outer covering case 1 is formed in a box shape by connecting outer peripheral wall 4 to a periphery of each of surface plates 3. Outer peripheral wall 4 provided at each convex corner 3a of each of surface plates 3 includes impact-absorbing wall 5 that is an outside surface, main body wall 6 disposed at an inner side of impact-absorbing wall 5, and impact-absorbing gap 7 separating impact-absorbing wall 5 and main body wall 6 from each other at a predetermined interval. Impact-absorbing gap 7 opens toward surface plates 3. Impact-absorbing wall 5 is deformed and absorbs an impact when receiving an impact.

Battery pack 100 of FIG. 1 includes impact-absorbing wall 5 on outer peripheral wall 4 of the entire periphery of one surface plate 3. Battery pack 200 of FIG. 2 includes impact-absorbing wall 5 on outer peripheral wall 4 of convex corners 3a at four corners of each of surface plates 3. Battery pack 300 of FIG. 3 includes impact-absorbing wall 5 on convex corners 3a at both ends of outer peripheral wall 4 opposite side to grip 15. As shown in these drawings, battery packs 100, 200, and 300 include impact-absorbing wall 5 on outer peripheral wall 4 of convex corners 3a of each of surface plates 3, but impact-absorbing wall 5 is not necessarily provided in all convex corners 3. Impact-absorbing walls is provided at least on convex corners 3a that receive an impact due to dropping or the like, and improves the impact strength.

(Core Pack 2)

Battery pack 100 shown in FIGS. 4 and 5 includes core pack 2 housing a plurality of cells inside outer covering case 1. In core pack 2, although not shown, a plurality of cells is disposed in a fixed position by a battery holder, and connected in series or in parallel. Furthermore, core pack 2 fixes a circuit board, on which a control circuit for controlling charging and discharging of the battery and a protection circuit are mounted, to the battery holder. Core pack 2 is disposed in a fixed position in outer covering case 1 without moving.

(Outer Covering Case 1)

Outer covering case 1 is formed in a box shape by connecting outer peripheral wall 4 to an outer peripheral edge of each of both surface plates 3 that are polygonal, and houses core pack 2 inside. In battery packs 100, 200, and 300 of FIGS. 1 to 3, each of surface plates 3 of outer covering case 1 is quadrangle, outer peripheral wall 4 is provided on the periphery of each of surface plates 3, and surface plates 3 and outer peripheral wall 4 form a rectangular parallelopiped box shape. Outer covering cases 1 of FIGS. 4 and 5 are formed by connecting first case 1X and second case 1Y, which are separately formed of plastic, at opening end surfaces, and include core pack 2 at a fixed position inside. In outer covering case 1, first case 1X and second case 1Y are connected to each other by connecting connection flanges 8 provided on the opening end surfaces of outer peripheral wall 4, and core pack 2 is disposed inside. In outer covering case 1 of FIG. 4, first case 1X and second case 1Y are connected to each other by screwing set screws 19 at predetermined intervals into connection flanges 8 of first case 1X and second case 1Y. In outer covering case 1 of FIG. 5, first case 1X and second case 1Y are connected to each other by welding or adhesively attaching connection flanges 8. In outer covering cases 1 mentioned above, connection flanges 8 of first case 1X and second case 1Y are connected by set screws 19 or welded or adhesively attached to each other. However, the present invention does not limit the structure of connecting the first case and the second case, and the first case and the second case can also be connected to each other by any other various connecting structures, for example, a fitting structure and a locking structure.

In outer covering cases 1 of FIGS. 1 and 2, surface plate 3 is quadrangular, but surface plate 3 is not necessarily quadrangular. For example, as shown in the front view of FIG. 3, the upper surface of outer covering case 1 may be in an arch shape, and grip 15 may be provided on the upper surface. Outer peripheral wall 4 at the both sides and outer peripheral wall 4 at the bottom surface may be connected at a right angle on the both sides of the bottom surface.

Outer covering case 1 includes impact-absorbing wall 5 for absorbing an impact on outer peripheral wall 4 at each convex corner 3a of each of surface plates 3, and absorbs an impact received on collision. In outer peripheral wall 4 shown in the sectional view of FIGS. 4 and 5, impact-absorbing gap 7 is provided between impact-absorbing wall 5 disposed at the outside surface and main body wall 6 disposed at the inner side of impact-absorbing wall 5. Impact-absorbing gap 7 separates impact-absorbing wall 5 and main body wall 6 from each other at a predetermined interval. Impact-absorbing gap 7 opens toward surface plates 3 and allows impact-absorbing wall 5 to be easily deformed due to an impact.

In battery packs 100 and 200, impact strength can be increased by increasing the strength of convex corners 3a of surface plates 3. Outer covering cases 1 of FIGS. 1 and 2 are provided with impact-absorbing wall 5 on outer peripheral wall 4 at each convex corner 3a of each of surface plates 3 to efficiently absorb an impact due to dropping or the like. Outer covering cases 1 of FIGS. 1 and 2 include impact-absorbing wall 5 curved along a curved convex corner 3a as a curved part curved at a predetermined radius of curvature on convex corner 3a of surface plate 3.

Outer covering case 1 of FIG. 2 includes reinforcing ribs 13 at predetermined intervals on the surface on outer peripheral wall 4 at linear regions 3b of surface plate 3. Each of reinforcing ribs 13 is plate-shaped, extends in the width of outer peripheral wall 4, and is integrally formed with outer peripheral wall 4. In outer covering case 1, impact-absorbing wall 5 absorbs an impact to convex corners 3a, and reinforcing ribs 13 on the surface reinforces linear region 3b with respect to impact.

In impact-absorbing walls 5 shown in sectional views of FIGS. 4 and 5, base parts of impact-absorbing wall 5 and main body wall 6 are connected to connection flanges 8 that connect first case 1X and second case 1Y. Opening width (W1) of opening part 7a of impact-absorbing gap 7 is, for example, 2 mm or more, preferably 3 mm or more, and further preferably 5 mm or more so that impact-absorbing wall 5 can be deformed in the direction shown by arrow A of FIGS. 4 and 5 when impact-absorbing wall 5 receives an impact.

Impact-absorbing gap 7 is formed in a tapered shape whose inner width is widened from connection flange 8 toward opening part 7a, and the amount of deformation due to an impact at a tip end of impact-absorbing wall 5 can be increased. Furthermore, impact-absorbing wall 5 has a shape in which the inner width (W2) of impact-absorbing gap 7 is widened toward opening part 7a and is gradually thinned from connection flange 8 toward opening part 7a. In impact-absorbing wall 5, the thinly formed tip edge is easily deformed and can efficiently absorb an impact.

Furthermore, as shown in FIGS. 4 and 5, impact-absorbing wall 5 can be structured in which impact-absorbing wall 5 and main body wall 6 are connected to each other by connection ribs 9 provided in impact-absorbing gap 7. Impact-absorbing wall 5 can increase the impact strength by reinforcing impact-absorbing wall 5 with connection ribs 9. Connection ribs 9 connecting at both ends of impact-absorbing wall 5 to main body wall 6 reinforce the impact strength as strength by which impact-absorbing wall 5 itself is deformed and absorbs an impact but not damaged when impact-absorbing wall 5 receives an impact. In outer covering case 1 of FIGS. 4 and 5, connection ribs 9 are provided in impact-absorbing gap 7 at predetermined intervals, and locally reinforce impact-absorbing wall 5 and main body wall 6. Impact-absorbing wall 5 can be reinforced while being deformed and absorbing an impact by adjusting the position and number of connection ribs 9 connecting impact-absorbing wall 5 and main body wall 6, and further adjusting strength and thickness at which imp act-absorbing wall 5 is deformed by the impact.

In impact-absorbing wall 5 shown in sectional views of FIGS. 4 and 5, the surface of the opening end is protrusion 5a protruding more than center part 5c of outer peripheral wall 4. In outer peripheral wall 4 in these drawings, the cross-sectional shape of the outside surface is a V-letter shape, and the outside surface of impact-absorbing wall 5 is inclined surface 5b protruding toward the tip edge from a region connected to connection flanges 8 of center part 5c, and the tip edge is protrusion 5a. Impact-absorbing wall 5 receives an impact due to dropping or the like in protrusion 5a that is easily deformed, and can absorb the impact efficiently. In impact-absorbing wall 5, no matter what position battery pack 100 is dropped on a flat ground or the like, the protruding tip edge of impact-absorbing wall 5 always collides with the ground or the like and absorbs the impact efficiently. Therefore, regardless of the dropping position of battery pack 100, impact-absorbing wall 5 can always effectively absorb an impact. Thus, the impact strength of outer covering case 1 can be strengthened.

In addition, as shown in the dashed line of FIG. 4, impact-absorbing wall 5 may be integrally provided with longitudinal ribs 10 protruding on the outer side surface along the tip edge to allow the tip edge of the impact-absorbing wall 5 to protrude more than the center part. In impact-absorbing wall 5 including longitudinal ribs 10 on the tip edge thereof, as shown in FIG. 4, the cross-sectional surface of the outer side surface of outer peripheral wall 4 is not necessarily a V-letter shape. The tip edge of impact-absorbing wall 5 may be protruded from the center part, and impact strength can be strengthened in all dropping positions. In addition, as shown in FIG. 4, a structure in which the cross-sectional shape of the outer side surface of outer peripheral wall 4 is a V-letter shape and longitudinal ribs 10 are provided to the tip edge of impact-absorbing wall 5 can increase the protrusion amount of the tip edge of imp act-absorbing wall 5 and can strengthen the impact strength in all dropping positions. Furthermore, impact-absorbing wall 5 provided with longitudinal ribs 10 at the tip edge thereof also achieves a feature that the impact strength of impact-absorbing wall 5 can be strengthened by diffusing the impact to both sides by longitudinal ribs 10 even when impact-absorbing wall 5 is dropped from battery pack 100 and the tip edge of the impact-absorbing wall 5 locally receives a strong impact. Therefore, no matter what position outer covering case 1 including impact-absorbing wall 5 formed in a shape shown by a dashed line in FIG. 4 is dropped, impact-absorbing wall 5 effectively absorbs an impact, and high impact strength is achieved. This is because no matter what position battery pack 100 is dropped, protrusion 5a at the side edge provided on both sides of outer peripheral wall 4 collides with the ground and the like, and absorbs an impact.

(Battery Pack 400)

Figure 6:
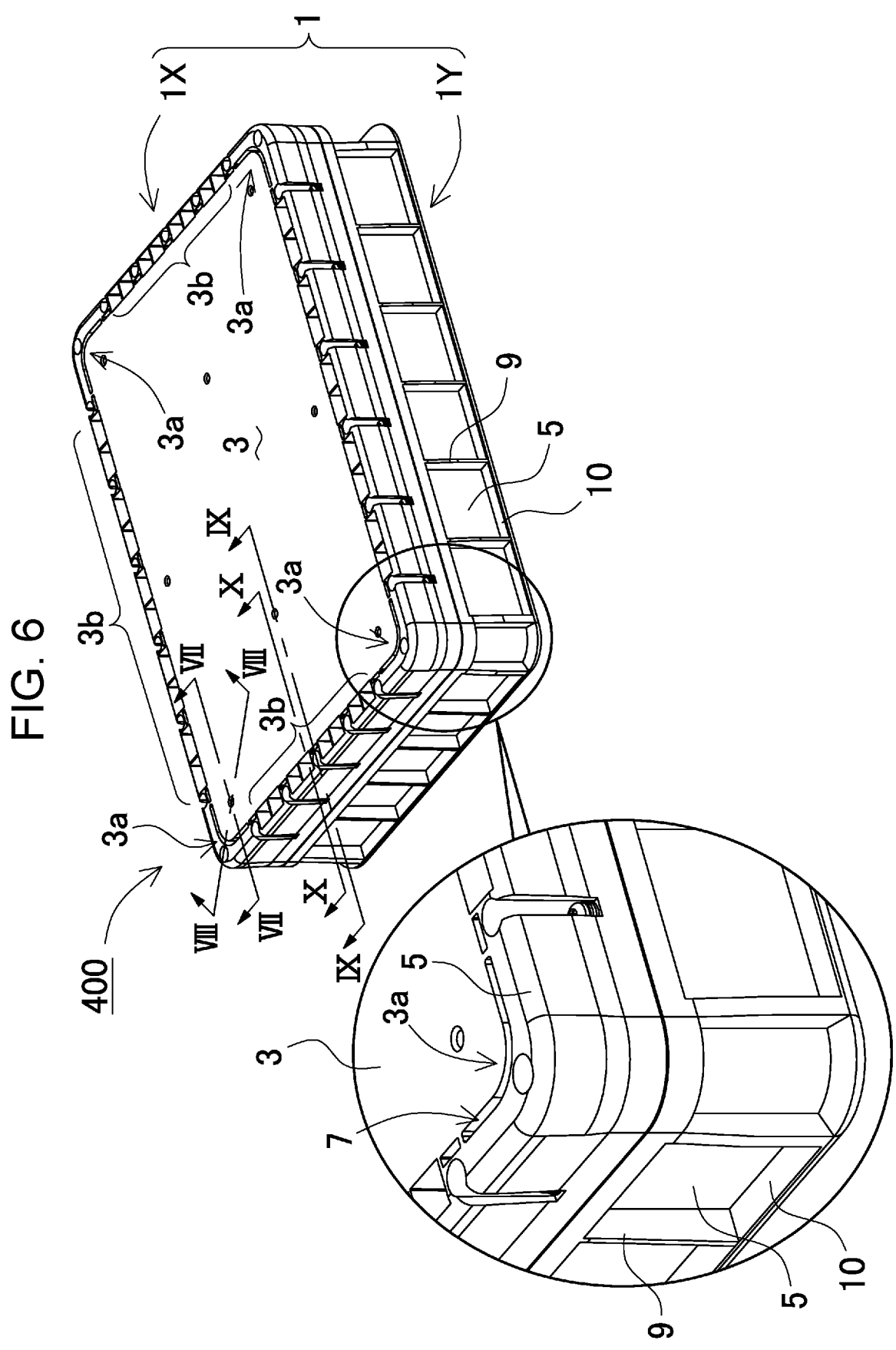
FIG. 6 is a partially enlarged perspective view of a battery pack according to a fourth exemplary embodiment of the present invention.

Battery pack 400 shown in the partially enlarged perspective view of FIG. 6 shows an embodiment in which first case 1X and second case 1Y, which are formed in different shapes, constitute outer covering case 1. FIGS. 7 to 10 respectively show expanded sectional perspective views of the battery pack shown in FIG. 6. In outer covering cases 1 of these drawings, first case 1X and second case 1Y are formed of plastic in different shapes, and impact-absorbing gap 7 and impact-absorbing wall 5 are provided in each of convex corners 3a of outer peripheral wall 4.

Figure 7:
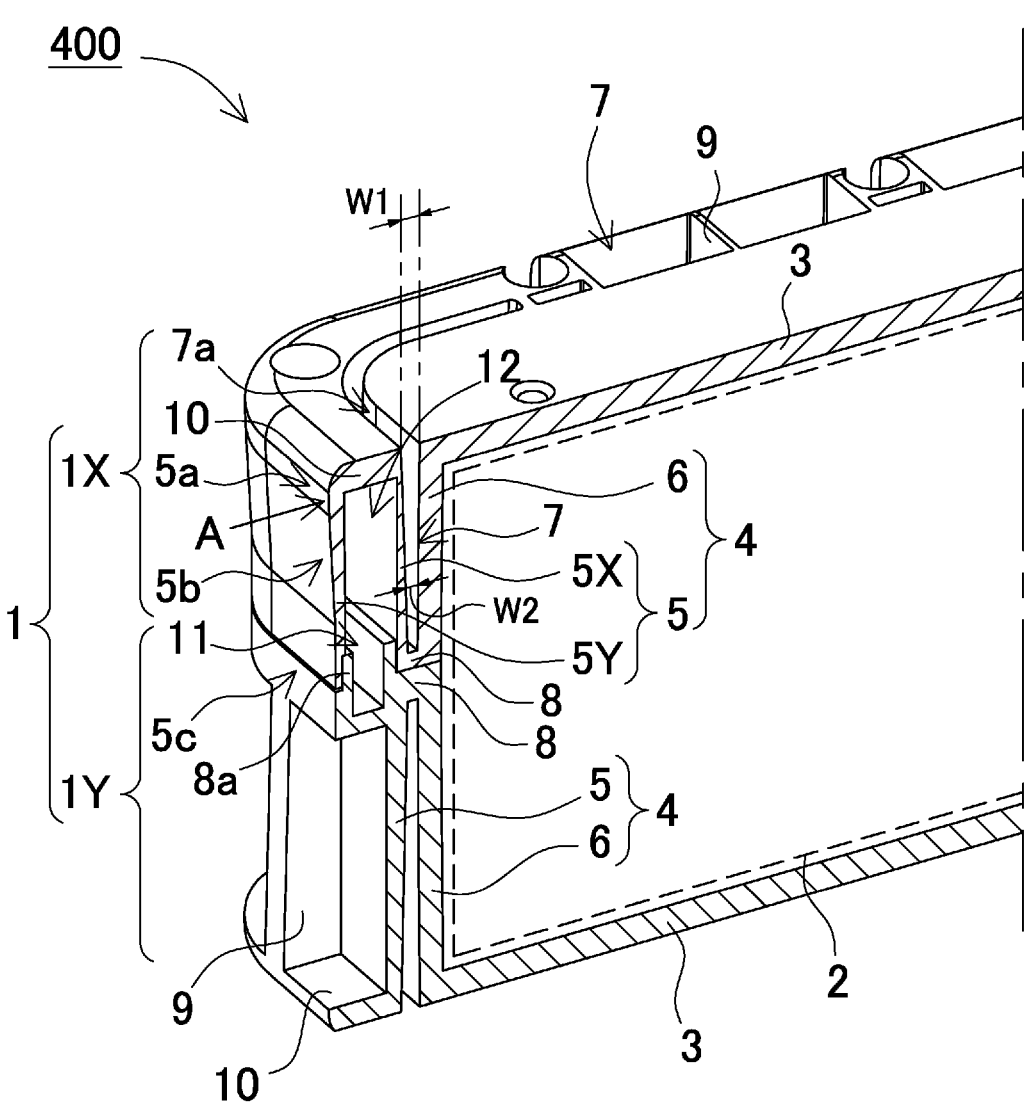
FIG. 7 is a sectional perspective view of the battery pack taken along line VII-VII shown in FIG. 6.

FIG. 7 is a sectional perspective view taken along line VII-VII of FIG. 6, and shows a sectional shape of outer peripheral wall 4 at convex corner 3a. In impact-absorbing wall 5 of this drawing, first impact-absorbing wall 5X and second impact-absorbing wall 5Y are connected to each other by longitudinal rib 10 being flush with surface plate 3, and impact-absorbing gap 7 is opened between longitudinal rib 10 and surface plate 3. Inside of first impact-absorbing wall 5X and second impact-absorbing wall 5Y is hollow, and lower-end opening part 11 is connected to connection flange 8 of second case 1Y. First impact-absorbing wall 5X is located inside second impact-absorbing wall 5Y, and includes a base part that is integrally connected to connection flange 8. Imp act-absorbing gap 7 is provided between first impact-absorbing wall 5X and main body wall 6. Second impact-absorbing wall 5Y is not connected to connection flange 8. Impact-absorbing wall 5 formed integrally of first impact-absorbing wall 5X and second impact-absorbing wall 5Y is configured to be deformed by the impact received in the direction shown by an arrow A of FIG. 7, and to absorb the impact.

Figure 8:
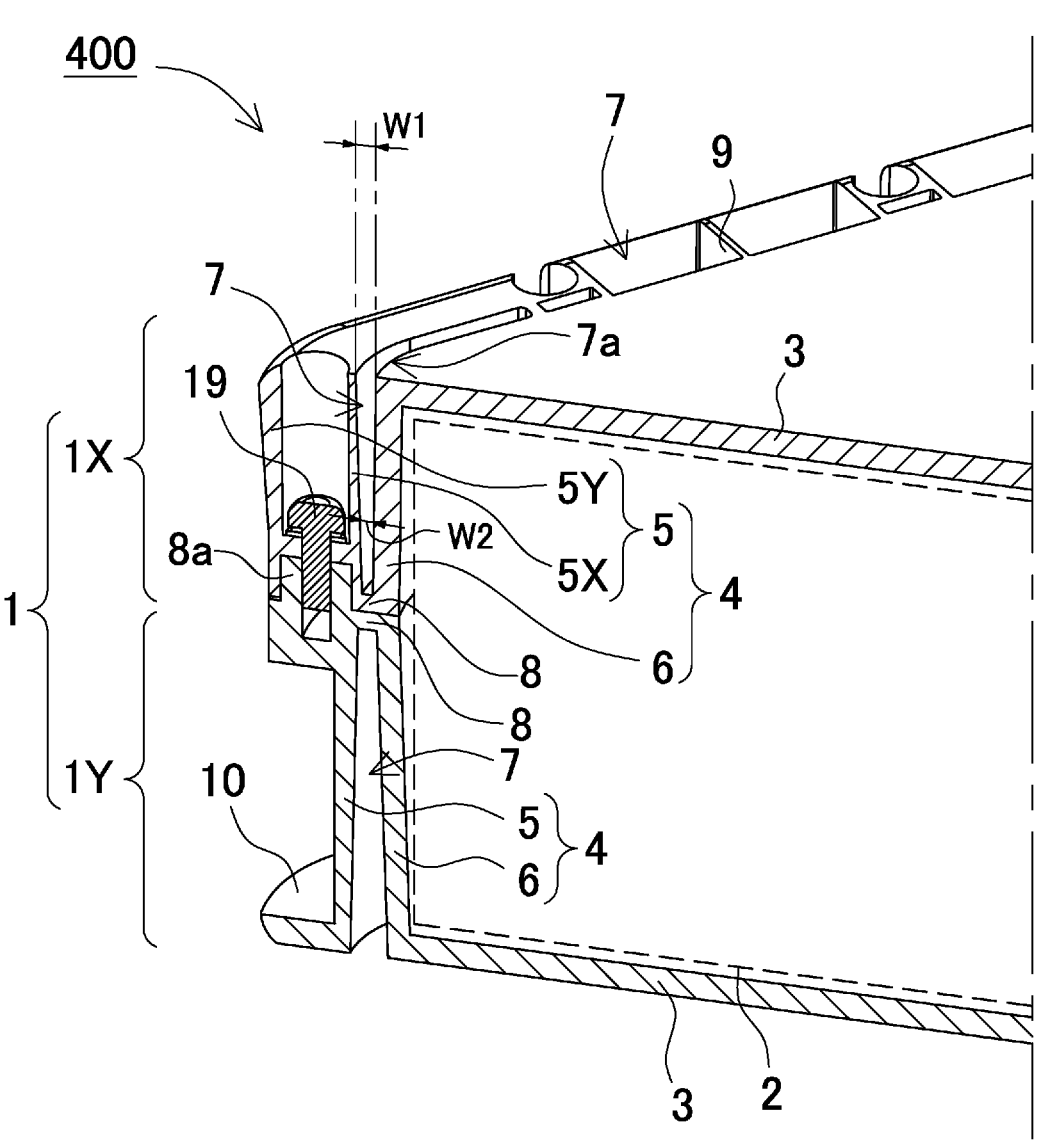
FIG. 8 is a sectional perspective view of the battery pack taken along line VIII-VIII shown in FIG. 6.

FIG. 8 is a sectional perspective view taken along line VIII-VIII of FIG. 6, and shows a connecting part of connection flanges 8 in convex corners 3a of first case 1X and second case 1Y. Connection flanges 8 respectively provided in first case 1X and second case 1Y are connected to each other by set screw 19. In the above impact-absorbing wall 5 provided at convex corner 3a, first impact-absorbing wall 5X and second impact-absorbing wall 5Y integrally connected to each other by longitudinal rib 10 constitute impact-absorbing wall 5, first impact-absorbing wall 5X disposed at the inner side of outer covering case 1 is entirely connected to connection flange 8, and second impact-absorbing wall 5Y is locally connected to connection flange 8 in only a region that is connected to second case 1Y by a set screw. Therefore, in a state in which impact-absorbing wall 5 receives an impact, since both first impact-absorbing wall 5X and second impact-absorbing wall 5Y are elastically deformed and absorb an impact, strength bearable to strong impact can be achieved.

Figure 9:
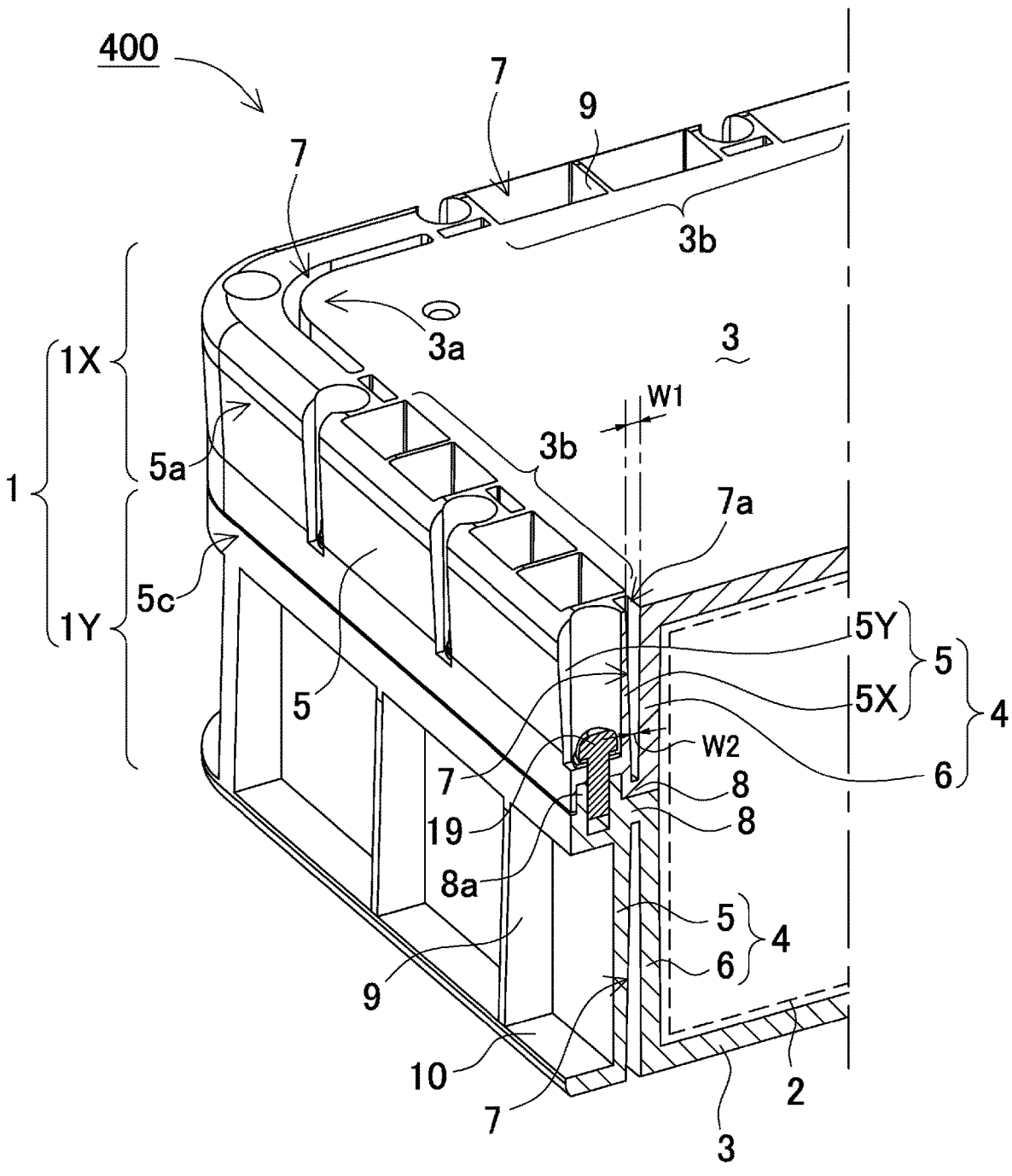
FIG. 9 is a sectional perspective view of the battery pack taken along line IX-IX shown in FIG. 6.

FIG. 9 is a sectional perspective view taken along line IX-IX of FIG. 6, and shows a connecting part of connection flanges 8 in one of linear regions 3b of first case 1X and second case 1Y. FIG. 9 shows a part in which connection flanges 8 are connected to each other by set screw 19. First case 1X and second case 1Y shown in FIGS. 8 and 9 are locally provided with connection flanges 8 in a part in which connection by set screw 19 is carried out. In first case 1X, in a region provided with connection flange 8, longitudinal rib 10 is provided with a through hole, and connection flange 8 is formed at the bottom part of the through hole. Set screw 19, screwed from connection flange 8 of first case 1X to connection flange 8 of second case 1Y, connects first case 1X and second case 1Y to each other by connection flanges 8. Hollow part 12 between first impact-absorbing wall 5X and second impact-absorbing wall 5Y, as shown in FIG. 7, is opened at the lower end in a region that is not connected by set screw 19. To lower-end opening part 11, connection ridge 8a provided in connection flange 8 of second case 1Y is fitted and connected.

Impact-absorbing wall 5 of first case 1X shown in the sectional perspective views of FIGS. 7 to 9 is in a tapered shape in which the inner width (W2) of impact-absorbing gap 7 is widened toward opening part 7a (upward in the drawings) and first impact-absorbing wall 5X is gradually thinned toward the tip edge, and the shape is easily deformed due to an impact. Impact-absorbing wall 5 can absorb the impact more effectively by increasing the amount of deformation against the impact force. Furthermore, impact-absorbing wall 5 of FIGS. 7 and 8 is provided with protrusion 5a at the tip edge on the outside surface of second impact-absorbing wall 5Y that is an outside surface of impact-absorbing wall 5. Impact-absorbing wall 5 collides with the ground and the like in dropping, protrusion 5a receives an impact against the ground and the like, impact-absorbing wall 5 can be effectively deformed and reliably absorb an impact.

Figure 10:
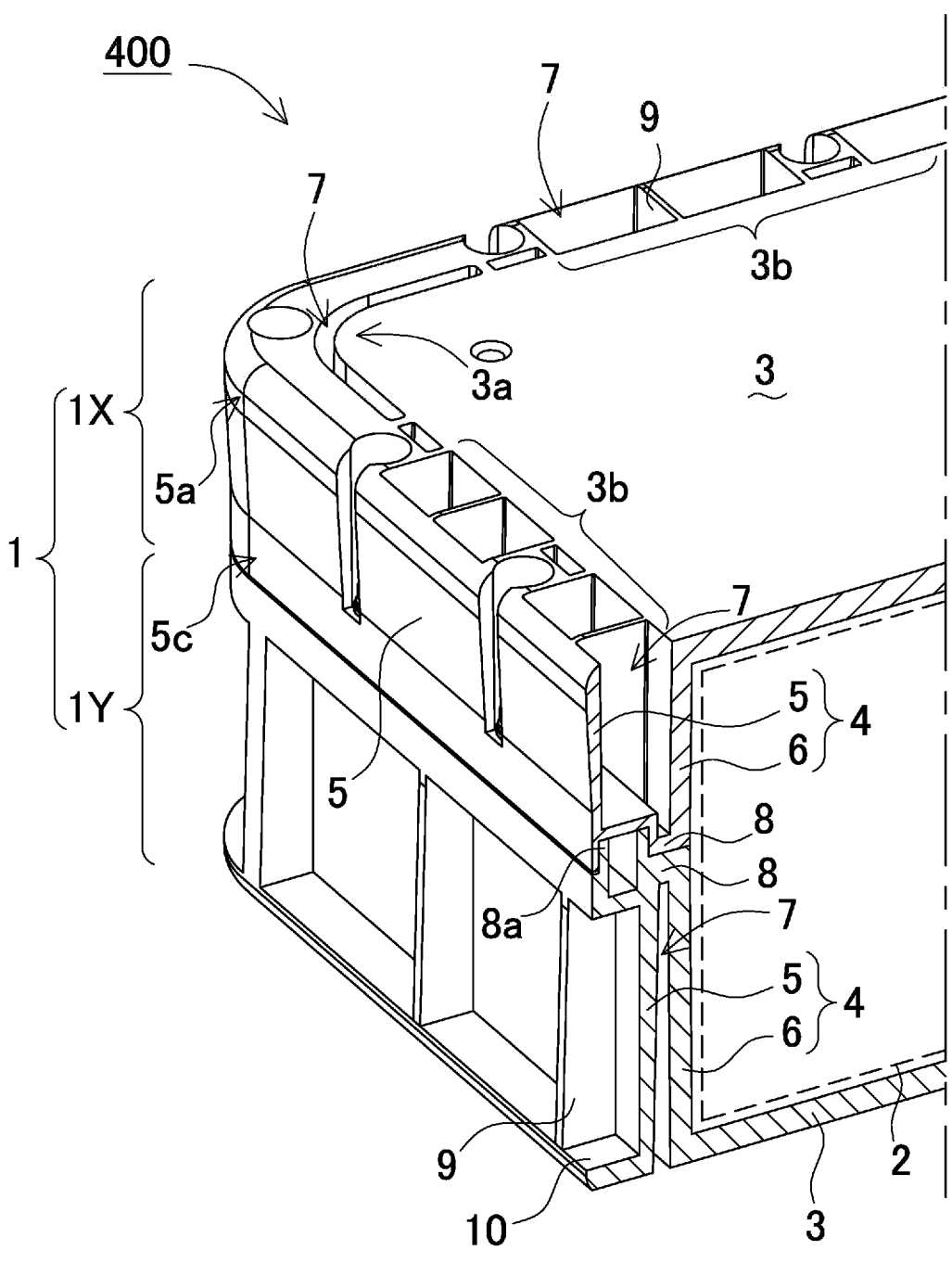
FIG. 10 is a sectional perspective view of the battery pack taken along line X-X shown in FIG. 6.

In first case 1X, outer peripheral wall 4 connected to linear region 3b of surface plate 3, as shown in FIG. 10, absorbs an impact by a single impact-absorbing wall 5 instead of absorbing an impact by two impact-absorbing walls. Outer peripheral wall 4 at linear region 3b is provided with impact-absorbing wall 5 being flush with second impact-absorbing wall 5Y, and impact-absorbing wall 5 is connected to the outer side surface of main body wall 6 by connection ribs 9. Impact-absorbing wall 5 is connected to main body wall 6 through a plurality of connection ribs 9 disposed at predetermined intervals. Since impact-absorbing wall 5 at linear region 3b is flush with second impact-absorbing wall 5Y, the opening width (W1) of impact-absorbing gap 7 provided between impact-absorbing wall 5 and main body wall 6 can be widened. Therefore, impact-absorbing wall 5 at linear region 3b can achieve a structure of efficiently absorbing the impact with strength by which impact-absorbing wall 5 is deformed but not damaged by an impact.

Since outer covering case 1 of FIG. 6 includes impact-absorbing gap 7 and impact-absorbing wall 5 over the entire periphery of surface plate 3 of first case 1X, the impact strength of the entire periphery can be strengthened. Impact-absorbing gap 7 and impact-absorbing wall 5 are not necessarily provided over the entire periphery of outer covering case 1, and impact-absorbing gap 7 and impact-absorbing wall 5 may be provided to only convex corners 3a, and impact-absorbing wall 5 may not be provided to linear region 3b of outer covering case 1.

In second case 1Y, as shown in the sectional perspective views of FIGS. 7 to 10, impact-absorbing wall 5 is formed of a single plate, and impact-absorbing gap 7 is provided between impact-absorbing wall 5 and main body wall 6. Impact-absorbing wall 5 is integrally provided with longitudinal rib 10 along the tip edge. In addition, connection ribs 9, extending in the width at predetermined intervals, are integrally formed on the surface of impact-absorbing wall 5. Connection ribs 9 are integrally formed with connection flange 8 and longitudinal rib 10 at both ends, and with impact-absorbing wall 5 at the side edge. Longitudinal ribs 10 are formed thicker than connection ribs 9 to distribute the impact acting on the tip edge of impact-absorbing wall 5 to both sides, thus preventing impact-absorbing wall 5 from being damaged. Since connection ribs 9 reinforce impact-absorbing wall 5 to suppress the amount of deformation against impact, the thickness and height of connection ribs

9 are adjusted, the space between the adjacent connection ribs 9 is further adjusted, and the thickness of impact-absorbing wall 5 is also adjusted to set the amount to the optimum value so that impact-absorbing wall 5 is deformed by an impact and absorbs the impact.

INDUSTRIAL APPLICABILITY

The present invention is a battery pack including a plurality of cells housed in an outer covering case, and can be suitably used as a battery pack that is excellent in impact strength against a large impact such as dropping.

REFERENCE MARKS IN THE DRAWINGS

100, 200, 300, 400 . . . battery pack
1 . . . outer covering case
1X . . . first case
1Y . . . second case
2 . . . core pack
3 . . . surface plate
3a . . . convex corner
3b . . . linear region
4 . . . outer peripheral wall
5 . . . impact-absorbing wall
5X . . . first impact-absorbing wall
5Y . . . second impact-absorbing wall
5a . . . protrusion
5b . . . inclined surface
5c . . . center part
6 . . . main body wall
7 . . . impact-absorbing gap
7a . . . opening part
8 . . . connection flange
8a . . . connection ridge
9 . . . connection rib
10 . . . longitudinal rib
11 . . . lower-end opening part
12 . . . hollow part
13 . . . reinforcing rib
15 . . . grip
19 . . . set screw

The invention claimed is:
1. A battery pack comprising:
a core pack housing a plurality of cells; and
an outer covering case housing the core pack,
the outer covering case being in a box shape by connecting outer peripheral walls to each other, the outer peripheral walls include an outer peripheral wall of an outer peripheral edge of each of a pair of surface plates,
the outer peripheral wall provided at convex corners of each of the pair of surface plates, including:
an impact-absorbing wall that is an outside surface of the outer covering case, a main body wall disposed inside the impact-absorbing wall, and an impact-absorbing gap separating the impact-absorbing wall and the main body wall from each other at a predetermined interval, the impact-absorbing gap opening in the surface plates, and
wherein the impact-absorbing wall includes a longitudinal rib protruding on an outer side surface and integrally provided along a tip edge.
2. The battery pack according to claim 1, wherein an opening width (W1) of the impact-absorbing gap is 2 mm or more.

3. The battery pack according to claim 1, wherein the outer covering case includes:

a first case formed in a box shape by integrally forming one of the pair of the surface plates with the outer peripheral wall on an outer periphery of the one of the pair of the surface plates, and a second case closing an opening part of the first case, the first case and the second case each include a connection flange connecting the main body wall and the impact-absorbing wall to each other, and the first case and the second case are connected to each other through the connection flanges.

4. The battery pack according to claim 1 wherein the outer peripheral wall includes a connection rib locally connecting the impact-absorbing wall and the main body wall to each other.

5. The battery pack according to claim 1, wherein each of the convex corners of each of the surface plates includes a curved part curved at a predetermined radius of curvature, and an opening part of the impact-absorbing gap is a slit curved along the curved part of each of the convex corners of each of the surface plates.

6. The battery pack according to claim 1, wherein the outer covering case includes a grip, and the outer covering case includes the impact-absorbing wall on convex corners of both sides of the outer peripheral wall located at an opposite side to the grip.

7. The battery pack according to claim 1, wherein a surface of a tip edge of the impact-absorbing wall is a protrusion protruding more than a center part of the outer peripheral wall.

8. The battery pack according to claim 7, wherein an outside surface of the impact-absorbing wall is an inclined surface protruding from the center part toward the tip edge.

9. The battery pack according to claim 7, wherein an entire shape of each of the surface plates is polygonal, and the outer peripheral wall connected to each of linear regions of each of the surface plates being polygonal includes the protrusion on both ends of each of the linear regions.

\* \* \* \* \*